United States Patent [19]

O'Connell

[11] 4,058,929

[45] * Nov. 22, 1977

[54] HOLDER FOR A FOAM BLOCK FOR SUPPORTING FLOWER ARRANGEMENTS

[75] Inventor: Donald L. O'Connell, Port Chester, N.Y.

[73] Assignee: Floral Innovations, Inc., Port Chester, N.Y.

[*] Notice: The portion of the term of this patent subsequent to June 15, 1993, has been disclaimed.

[21] Appl. No.: 661,096

[22] Filed: Feb. 25, 1976

[51] Int. Cl.² ............................................. A01G 5/04
[52] U.S. Cl. ................................................ 47/41.12
[58] Field of Search .................. 47/41.11, 41.12, 41.13

[56] References Cited

U.S. PATENT DOCUMENTS

| 1,353,709 | 9/1920 | Bauer | 47/41.11 |
|---|---|---|---|
| 2,774,187 | 12/1956 | Smithers | 47/41.12 |
| 2,818,681 | 1/1958 | Coplen | 47/41.12 X |
| 2,850,826 | 9/1958 | Testa | 47/41.12 |
| 2,981,033 | 4/1961 | Cheetwood | 47/41.12 |
| 2,994,985 | 8/1961 | Jackson | 47/41.12 X |
| 3,007,282 | 11/1961 | Galesky | 47/41.12 |
| 3,290,820 | 12/1966 | Aebersold | 47/41.12 |
| 3,682,347 | 8/1972 | Barrier | 47/41.1 X |
| 3,812,617 | 5/1974 | Brody | 47/41.12 X |
| 3,962,825 | 6/1976 | O'Connell | 47/41.12 |

Primary Examiner—Clifford D. Crowder
Assistant Examiner—James R. Feyrer
Attorney, Agent, or Firm—Laurence B. Dodds

[57] ABSTRACT

A holder for one or more foam blocks for supporting flower arrangements for use in association with a support for mounting the holder substantially vertically, as on an easel, comprises one or more hollow tray-like base members each having outer side walls, substantially vertical inner side walls, and upper and lower bottom walls forming one or more water-confining compartments for supporting one or more foam blocks. The foam blocks are of configurations substantially fitting the compartments and certain of the compartment walls have protruding ribs for preventing engagement of the foam blocks therewith. Each of the receptacle compartments has at least one aperture at the junction of the upper bottom wall and the lowermost side wall, as when mounted on an easel, for draining excess water from the blocks. The upper bottom wall of each of the receptacle compartments has a plurality of perforations and there are provided a plurality of L-shaped fastening members, each having a pointed lower extremity for piercing a foam block and detachably engaging one of the perforations in the upper bottom walls of the compartments, thus laterally supporting each of the foam blocks.

6 Claims, 6 Drawing Figures

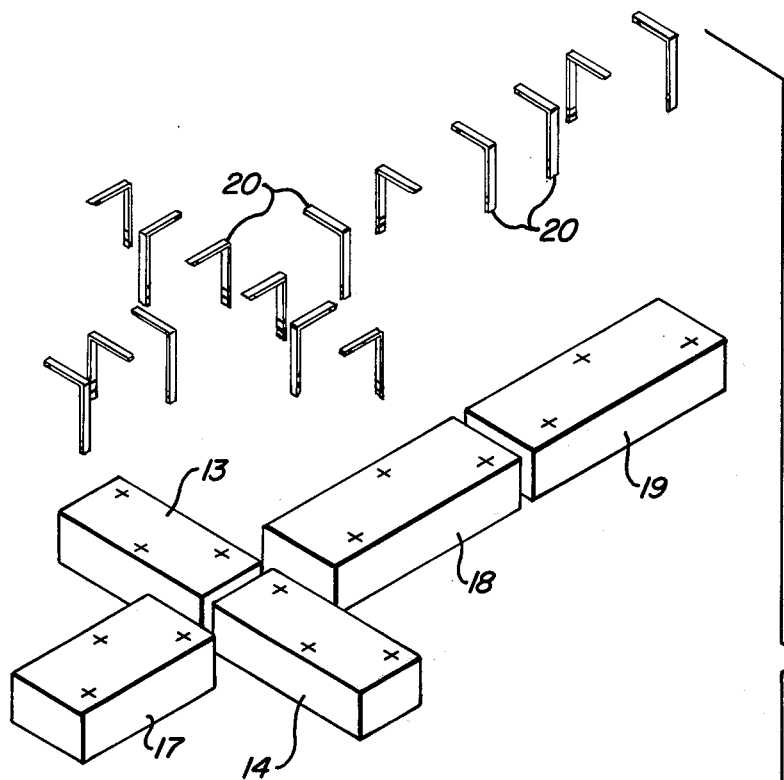
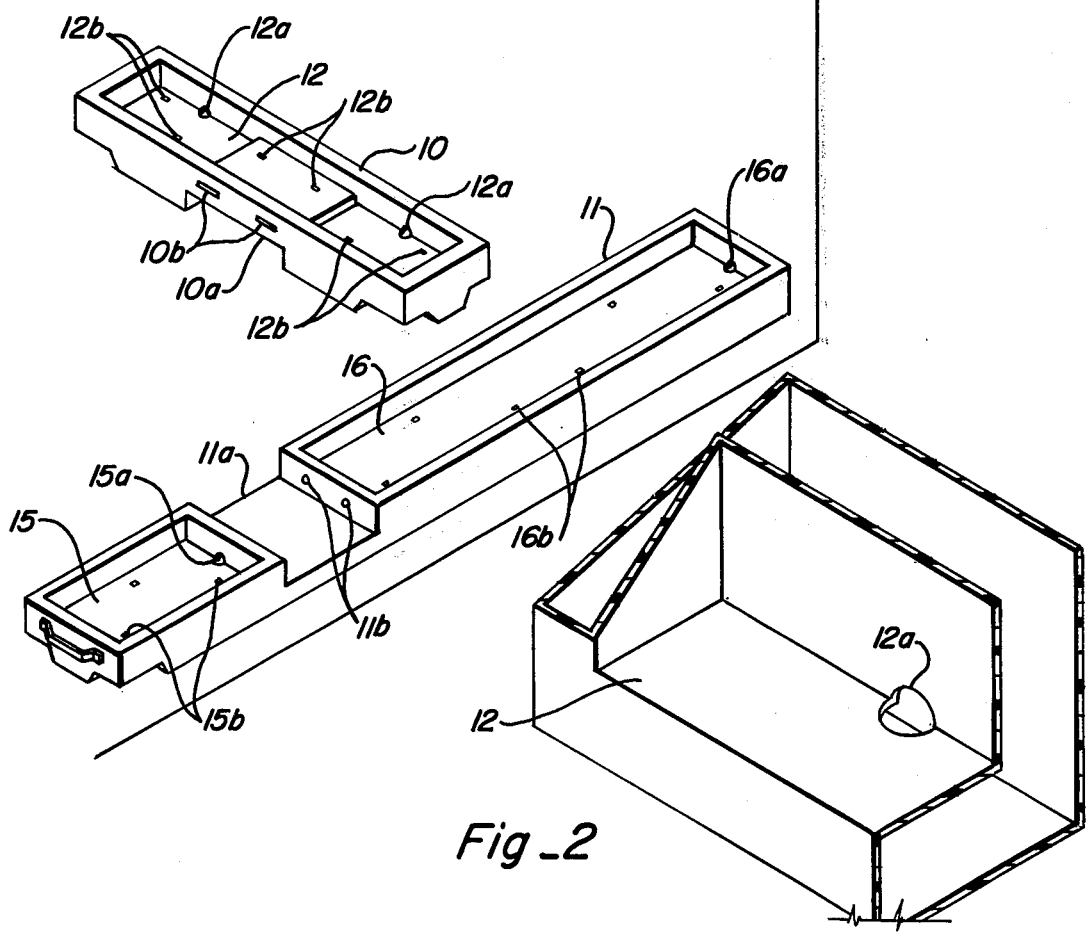
Fig_1
Fig_2

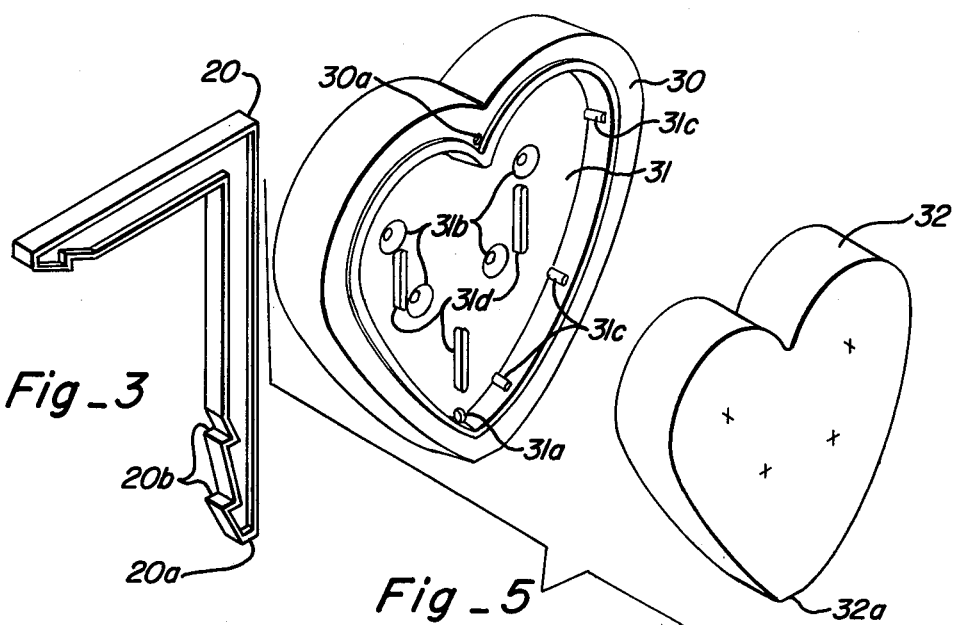
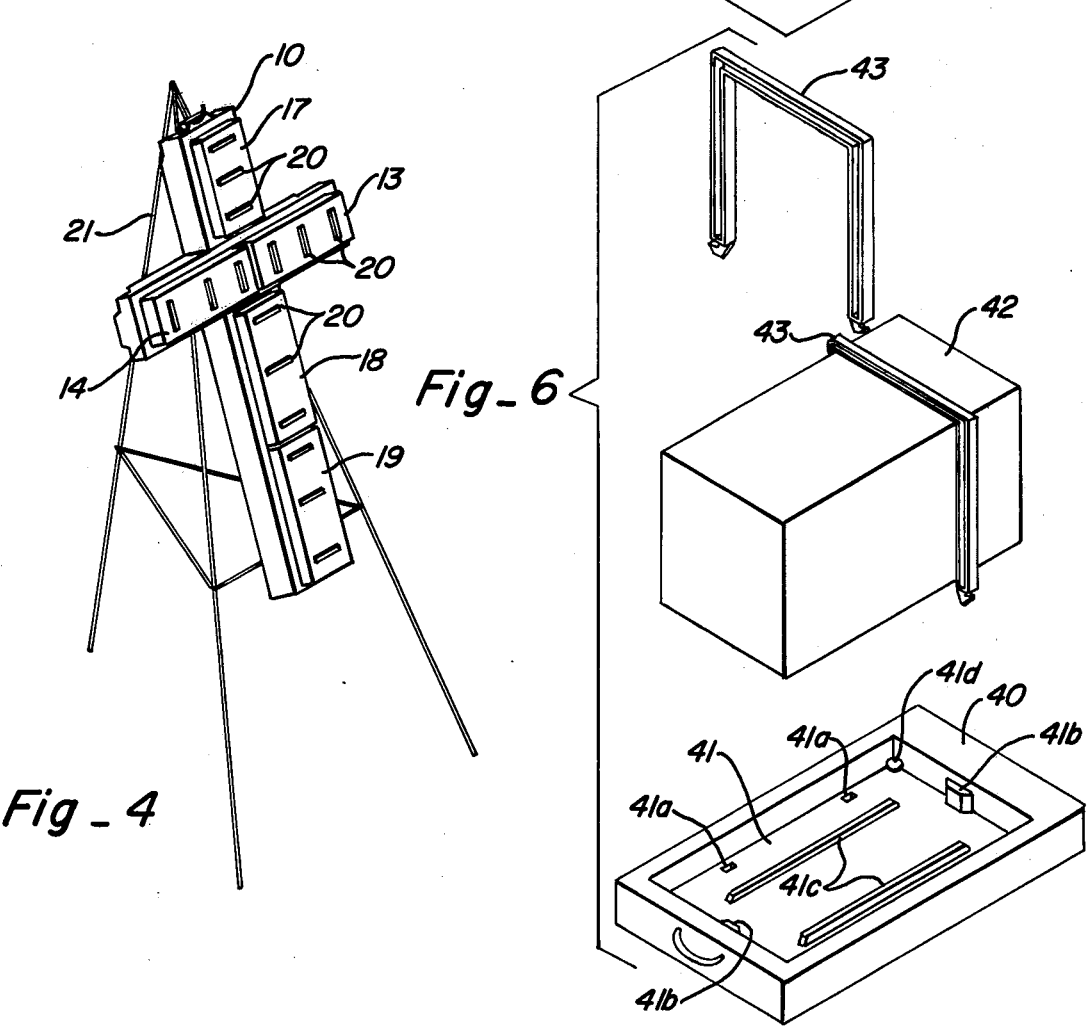

HOLDER FOR A FOAM BLOCK FOR SUPPORTING FLOWER ARRANGEMENTS

BACKGROUND OF THE INVENTION

1. Field of the Invention

The flower holder of the present invention is of general application but is particularly suited for use by florists in making formal flower arrangements for use at weddings, funerals and other public occasions.

2. Description of the Prior Art

In Applicant's copending application Ser. No. 542,123, filed Jan. 20, 1975, and entitled "A Holder for Supporting Flower Arrangements," now U.S. Pat. No. 3,962,825, dated June 15, 1976, there is described and claimed a holder for a foam block for supporting flower arrangements which comprises a hollow tray-like base member forming a water-confining receptacle for supporting a foam block, the upper wall of such receptacle having one or more apertures for draining excess water from the foam block into the receptacle, and a plurality of elongated fastening members shaped to engage and laterally support the foam block and detachably engageable with the base member. That holder for flower arrangements was designed and intended primarily for use in the horizontal position, as on the top of a funeral casket. The present invention comprises a modification of the flower holder of aforesaid U.S. Pat. No. 3,962,825 which is adapted for inclined mounting, as on an easel.

SUMMARY OF THE INVENTION

In accordance with the invention, a holder for one or more foam blocks for supporting flower arrangements for use in association with a support for mounting the holder substantially vertically comprises one or more hollow tray-like base members, each having outer side walls, substantially vertical inner side walls, and upper and lower bottom walls forming one or more water-confining receptacles, each having a compartment for supporting one or more foam blocks, at least one aperture at the junction of the upper bottom wall and the lowermost side wall of each compartment, when mounted substantially vertically, for draining excess water from the foam blocks, and at least one elongated fastening member adapted to engage and laterally support each of the foam blocks and detachably engageable with its associated compartment.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 1 is an exploded perspective view of one form of holder for a foam block for supporting flower arrangements in accordance with the invention;

FIG. 2 is a fragmentary sectional view showing in detail one of the drainage holes of the compartments of FIG. 1;

FIG. 3 is a perspective view of a detachable foam block fastening member suitable for use in the holder of FIG. 1;

FIG. 4 is a perspective assembly view of the holder of FIG. 1 mounted on an easel;

FIG. 5 is an exploded perspective view of an alternative form of holder embodying the invention; while FIG. 6 is an exploded perspective view of a second alternative form of holder embodying the invention.

DESCRIPTION OF THE PREFERRED EMBODIMENTS

Referring now to FIG. 1, there is shown in exploded perspective, a holder for several foam blocks for supporting flower arrangements and adapted for mounting substantially vertically, as on an easel. This holder comprises two elongated tray-like base members 10 and 11 interfitting in the form of a cross by way of recesses 10a and 11a in the members 10 and 11, respectively, the member 10 also having recesses 10b adapted to engage protrusions 11b in the sides of the recess 11a to effect a snap fit between the members 10 and 11. The member 10 forms a single continuous compartment 12 adapted to receive foam blocks 13 and 14 while the member 11 has formed therein two compartments 15 and 16 proportioned to receive foam blocks 17, 18, and 19. In each of the compartments 12, 15, and 16 there is an aperture at the junction of the upper bottom wall of the compartment and the lowermost side wall when the holder is mounted substantially vertically, specifically the apertures 12a, 12a, 15a, and 16a in the compartments 12, 15, and 16, respectively, for draining excess water from the foam blocks.

One of the drainage apertures 12a of compartment 12 is shown in enlarged detail in the fragmentary cross-sectional perspective view of FIG. 2, from which it is seen that the aperture 12a can be formed at an angle through the junction of the side wall and upper bottom wall of the compartment 12.

The upper bottom wall of each of the compartments has a plurality of perforations, such as the perforations 12b, 15b, and 16b of the compartments 12, 15, and 16, respectively. There are provided a plurality of L-shaped fastening members 20, shown in detail in perspective in FIG. 3, and formed of resilient material such as metal or thermosetting plastic, preferably polypropylene. Each member 20 includes a pointed lower extremity 20a for piercing a foam block and detachably engaging one of the perforations in the compartments 12, 15, or 16, as described above. The vertical portion of each of the fastening members preferably has several notches 20b for detachably engaging the perforations with different insertions to accommodate foam blocks of different thicknesses. The detachable fasteners 20 thus engage and laterally support each of the foam blocks. The points of penetration of the fasteners through the blocks are indicated schematically by the crosses in the upper faces of the blocks 13, 14, 17, 18, and 19.

The holder illustrated in FIGS. 1, 2, and 3 and described above is shown in assembled form in FIG. 4 mounted on an easel 21. It will be clear that, in this position, the drainage apertures 12a, 12a, 15a, and 16a are in the lowermost walls of their respective compartments, thereby effectively draining excess water into the water-confining receptacles formed between the upper and lower bottom walls of the members.

Referring now to FIG. 5, there is shown an exploded perspective view of an alternate form of flower holder embodying the invention. In this instance, the tray-like base member 30 is in the form of a heart with a foam supporting compartment 31. The base member 30 is adapted to be mounted, substantially vertically, as on an easel, as in the case of the cross-shaped holder of FIG. 4, with its vertex in the lowermost position. The compartment is provided with a drainage hole 31a at such vertex for draining excess water from the compartment 31 into the water-confining receptacle. In addition, a hole 30a may be provided in the upper portion of the receptacle to drain water therefrom. Shown also are apertures 31b adapted to be detachably engaged by the fastening members, such as the member 20 of FIG. 3. The compartment 31 of base member 30 is adapted to receive a foam block 32 of a configuration substantially fitting the compartment but the vertex 32a is cut away to avoid covering the drainage hole 31a. The side walls of the compartment 31 are provided with protruding ribs 31c while the upper bottom wall of the compartment 31 is provided with protruding ribs 31d for preventing engagement of the foam block 32 with the walls of the compartment 31 in order to facilitate drainage of excess water from the compartment. The foam block 32 is retained in the compartment 31 by a plurality of fasteners (not shown), the points of insertion through the block 32 being shown schematically by crosses corresponding in position to the apertures 31b in the bottom wall of compartment 31.

In FIG. 6 is shown an exploded perspective view of an alternate form of the invention in which the base member 40 is of the configuration of a simple rectangular receptacle including a compartment 41 for receiving a rectangular foam block 42 which is retained in the compartment 41 by means of a pair of U-shaped stirrup fasteners 43, 43, the extremities detachably engaging apertures 41a, 41a in compartment 41. The compartment 41 has ribs 41b, 41b protruding from its vertical side walls and ribs 41c protruding from its upper bottom wall for preventing engagement of the foam block 42 with the walls and facilitating drainage through a pair of drainage apertures 41d, only one being shown in the perspective view.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A holder for at least one foam block for supporting flower arrangements for use in association with a support for mounting the holder substantially vertically comprising:

at least one hollow tray-like base member having outer side walls, substantially vertical inner side walls, and upper and lower bottom walls forming a water-confining receptacle having a compartment for supporting a foam block;

at least one aperture at the junction of the upper bottom wall and the lowermost side wall of said compartment, when mounted substantially vertically, for draining excess water from the foam block;

and at least one elongated fastening member adapted to engage and laterally support the foam block and detachably engageable with said compartment.

2. A holder for at least one foam block for supporting flower arrangements in accordance with claim 1 in which said upper bottom wall has a plurality of perforations and in which each of said fastening members is L-shaped and has a pointed lower extremity for piercing a foam block and detachably engaging one of said perforations.

3. A holder for at least one foam block for supporting flower arrangements in accordance with claim 1 in which the foam block is of a configuration substantially fitting said compartment and in which certain of said compartment walls have protruding ribs for preventing engagement of the foam block therewith.

4. A holder for at least one foam block for supporting flower arrangements in accordance with claim 1 comprising two elongated tray-like base members interfitting in the form of a cross and forming a plurality of separate receptacle compartments, each having a drainage aperture as described in claim 1.

5. A holder for at least one foam block for supporting flower arrangements in accordance with claim 1 in which the receptacle compartment is of a configuration having a lowermost vertex when mounted substantially vertically and in which said drainage aperture is disposed at said vertex.

6. A holder for at least one foam block for supporting flower arrangements in accordance with claim 5 in which the foam block is of a configuration substantially fitting said compartment except for the region of said drainage hole.

* * * * *